Feb. 5, 1946.　　　　J. HARMON　　　　2,393,987
COMPOSITE MATERIAL
Filed Nov. 26, 1941
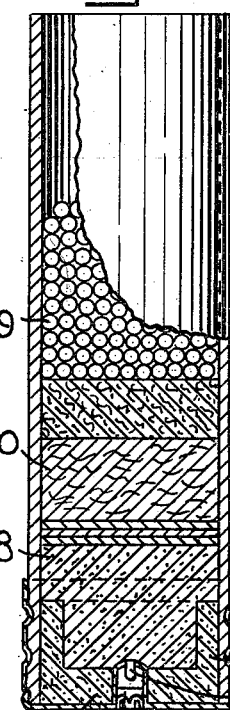
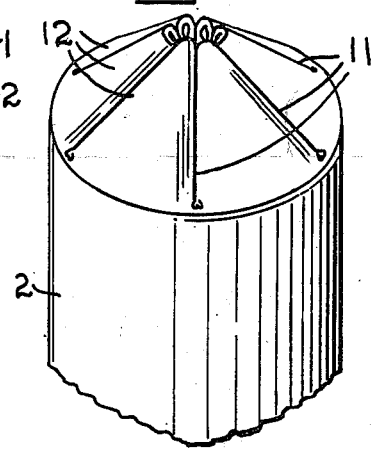
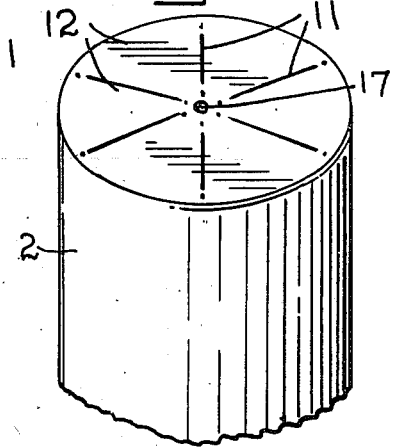
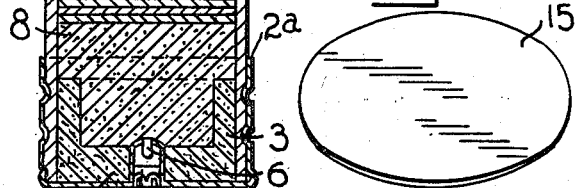
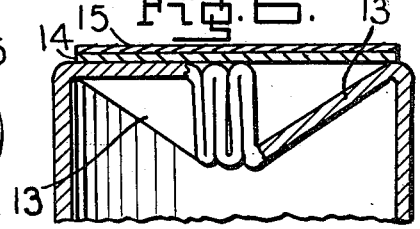
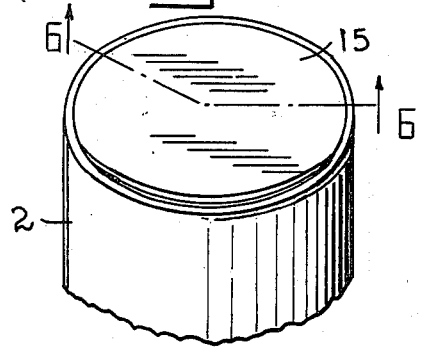
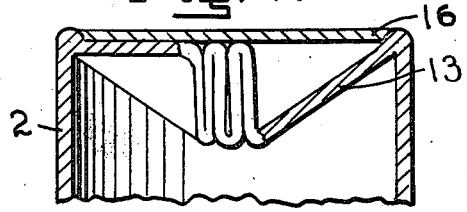
INVENTOR.
Jesse Harmon
BY A. F. Miller
ATTORNEY.

Patented Feb. 5, 1946

2,393,987

UNITED STATES PATENT OFFICE 2,393,987

COMPOSITE MATERIAL

Jesse Harmon, Wilmington, Del., assignor to E. I. du Pont de Nemours & Company, Wilmington, Del., a corporation of Delaware Application November 26, 1941, Serial No. 420,589

2 Claims. (Cl. 154—50)

This invention relates to the art of sealing waxed or waterproof surfaces, and more particularly to improvements in the manufacture of shot shells presenting such surfaces.

The adhesives normally employed for waxed and oiled surfaced papers are blends of rubber or rubber derivatives with paraffin wax and a gum or resin. These adhesives, however, are unsuitable in many applications, for example, in applications where the adhesive bond is subjected to adverse storage conditions. The low softening points of such rubber base adhesives is a disadvantage in that the bond has strength only when relatively cold. This low softening point also is a disadvantage in that when warm the adhesive composition exudes from an adhesive seal. A still more serious disadvantage of such adhesives is that on storage under warm conditions the oily materials in the paper surface migrate into the adhesive bond and soften it so that practically all adhesion is lost even at low temperatures.

The above mentioned defects are particularly undesirable in the sealing of the ends of shot shells which as usually made are composed of a waxed and oiled paper. A type of shot shell that has met with considerable success is one in which the usual top wad has been omitted and in which the top of the shell above the charge has been creased into segments which are folded over the top of the shell to form a planar end closure substantially flush with the end of the shell, the segments then being sealed with an adhesive of the type previously mentioned. The adhesives previously found for sealing the highly waxed surfaces of the shell have, however, prevented full realization of the advantages which are inherent in such shell construction; among which advantages are improved ballistic properties through control in confinement and pressure in the charge, and improved shot patterns due to the absence of the shot dispersing top wad. The rubber blend in addition to deterioration in adhesion after warm storage exudes on the walls of the gun chamber when the shell is fired and causes an undesirable deposit of resinuos material which interferes with easy ejection of shells from the gun.

This invention has as an object the manufacture of improved shot shells. A further object is a shot shell of improved ballistic properties in which the usual top wad is eliminated and in which the blown or scattered shot pattern resulting from this wad closure is avoided. A further object is the manufacture of a shot shell in which the burning rate of the propellant powder can be closely controlled and adapted to the burning characteristics of different powders. A further object is a shot shell having these properties which is sealed with a material which does not foul the gun barrel with an undesirable deposit and which does not lose its adhesion either at moderately elevated temperatures or after long periods of warm storage. A further object is a method for sealing the surfaces of an article in which one of the surfaces is waxed or waterproofed paper. A still further object is the production of improved containers which are composed of waxed paper and which have a sealing element directly bonded to the waxed surface of the paper. Other objects will appear hereinafter.

The above objects are accomplished in the manner more particularly pointed out hereinafter by the utilization of synthetic linear polyamides as a sealing or bonding element for structures having an oiled or waxed surface. By means of these polyamides the oiled or waxed surface can be bonded strongly to like or different surfaces.

The different surfaces referred to above can include synthetic linear polyamide, as for example where a sheet of polyamide is bonded to the oiled surface by means of an adhesive layer of the same or other polyamide or where the side of the polyamide sheet, which is bonded to the oiled surface, is rendered adhesive by means of heat or a softening agent. The reference herein to oiled surfaces is intended to include waxed surfaces.

A preferred embodiment illustrative of the practice and advantages of this invention is shown in the accompanying drawing in which:

Fig. 1 is an elevation, partly in section, of a shot shell before sealing;

Fig. 2 is a fragmentary perspective view of the shell after application of the initial closing treatment;

Fig. 3 is a fragmentary perspective view wherein the segmented top portion has been forced down to form a plane surface flush with the end of the shell;

Fig. 4 is a perspective view of the sealing element or disc for sealing the top of the shell;

Fig. 5 is a fragmentary perspective view of the shell after the closure has been sealed in accordance with the practice of this invention;

Fig. 6 is a fragmentary longitudinal sectional view taken on the line 6—6 of Fig. 5, the right half of this figure being a section through the crease and the left half being a section through the middle of a sector;

Fig. 7 is a view similar to Fig. 6 showing a slightly modified construction; and Fig. 8 is a fragmentary perspective view of the open end of a fired shell.

The numeral 1 indicates the body of a shot shell before the sealing of its top. The shell body is composed of a portion 2, consisting of paper waterproofed by a combination of paraffin wax and an oil, for example a drying oil such as China-wood oil or linseed oil, and of a metal head 2a. The metal head contains the usual base wad 3, battery cup 4, primer cup 5, anvil 6, and priming composition 7. The numeral 8 indicates the charge of propellant powder which is separated from the shot charge 9 by one or more filler wads 10, and is ignited by the flame of the priming composition resulting from the striking of the primer cup with a firing pin. The top of the shell is closed by forming with a suitable tool a number of creases 11 which define triangular areas or segments 12 in the deformable material of the shell body above the shot charge and which draw the top of the shell into the partially closed position shown in Fig. 2. The segments 12 are then pressed by means of a rotating die to circular form in a plane substantially flush with the ends of the shell, the connecting material at the creases extending below this plane as indicated by the numeral 13. This method of closing the top of the shell by means of the material of the body of the shell itself is advantageous for several reasons, but as previously indicated the full advantages of this construction have not been realized. The sealing of such a shot shell closure is necessary by reason of the fact that a small aperture 17 inevitably remains at the center. Moreover, while the margins of the folds or creases 11 are firmly pressed together they are susceptible to penetration by moisture. As heretofore discussed, it is always difficult to secure adhesion to a waxed or oiled surface. In shot shells adhesion difficulties are augmented by the hardening and smoothing of the surface incident to the accurate "sizing" of the tubes to gun chamber fit by forcing them through a metal die.

In accordance with the present invention the small aperture 17 remaining at the center is closed and the waxed and oiled folded segments 12 of the shell body are sealed so that a predetermined pressure is required to break the seal, by means of the synthetic linear polyamide previously referred to. In one method of making the seal a film 14 of the polyamide is applied from solution or otherwise to a paper disc 15, and the polyamide coated side of the disc applied to the crimped top after which adhesion is effected by means of heat and pressure through application of a hot plate to the disc. In Fig. 6 the thickness of both the adhesive film 14 and the paper disc 15 have been exaggerated for greater clarity of illustration. In another method of making the seal the end of the shell, as illustrated in Fig. 7, is indented slightly and the seal is effected solely by a film 16 of the polyamide which lies flush with the top of the shell.

When the shot shell described above is fired, the polyamide film 14 and the paper 15 are ruptured along the margins of the segments 12, the crimped portion of the shell forming the closure straightens to its original cylindrical form, and the segments of the sealing disc, indicated by the numeral 18 in Fig. 8, remain attached to the shell body.

The synthetic linear polyamides used in the practice of this invention are of the general type described in U. S. Patents 2,071,250, 2,071,253, and 2,130,948. The preferred products have an intrinsic viscosity (as defined in the last mentioned patent) of at least 0.4. The polyamides of this kind, generally speaking, comprise the reaction product of a linear polymer-forming composition, for example, one consisting essentially of bifunctional reacting material, which comprises in substantial amount molecules containing two amide-forming groups each of which is complementary to an amide-forming group in other molecules in said composition.

These polyamides as described above, or as otherwise identified hereinafter, can be obtained, for example, by self-polymerization of a monoaminomonocarboxylic acid, or by reacting a diamine with a dibasic carboxylic acid in substantially equimolecular amounts, it being understood that reference herein to the amino acids, diamines and dibasic carboxylic acids is intended to include the equivalent amide-forming derivatives of these reactants. In the polyamides obtained from these reactants the average number of carbon atoms separating the amide groups is at least two.

These linear polyamides include also polymers obtained by admixture of other linear polymer-forming reactants, as for instance, glycol-dibasic acid mixtures in the case of polyesteramides, with the mentioned polyamide-forming reactants. The diamine-dibasic acid polyamides are most easily obtained by polymerizing the diammonium salt which forms on simple contact of these reactants and which avoids the necessity for adjusting the reactants to equimolecular proportions.

The polyamides which are most valuable in obtaining the required adhesion with the oiled paper are the interpolyamides obtained from a mixture of different polyamide-forming reactants, and the polyester-amides obtained by including bifunctional reactants, such as glycols and hydroxy acids, containing an ester-forming group with the polyamide-forming reactants. Exceptional adhesion in sealing of the waxed or oiled surface is obtained with the diisocyanate treated polyester-amides which are formed by reacting a low molecular weight polyester-amide with a diisocyanate until a high molecular weight polymer is obtained. In the case of other polyamides in which the adhesion for the waxed or oiled surface is below that obtained in the interpolymers mentioned above, the necessary adhesion can be obtained by abrading the oiled surface.

The invention is further illustrated by the following examples in which the parts are by weight.

*Example I*

A polyamide is prepared by heating 60 parts of 12-aminostearic acid and 40 parts of hexamethylenediammonium adipate for 3½ hours at 210° C. under 200 pounds per square inch pressure and then for 4¼ hours at 260° C. under reduced pressure. A solution is prepared from 50 parts of this polyamide, 12½ parts of 1,12-di-(hydroxyphenyl)octadecane as plasticizer, and 35.5 parts of a solvent mixture of 2 parts of chloroform and 1 part of methanol. This solution is applied to 50# Litho paper by means of a doctor knife to give a film of polyamide 0.0015" thick. A circular disc of this polyamide coated paper, preferably of such diameter as to completely cover the creases 11 between sectors 12 without projecting beyond the outer periphery of the shell (Fig. 3), is pressed against the crimped end of the shell with a hot plate at a temperature of 225° C. for several seconds.

A strong bond is formed so that the disc cannot be removed without tearing the paper. The disc adheres perfectly at a temperature of 75° C. and also does not lose any of its adhesion on storage at 50° C. for 7 days. On the other hand, a shell similarly sealed with a blend of 60 parts rubber, 30 parts paraffin and 10 parts ester gum, although having good initial adhesion, is no longer adherent at 75° C. and does not regain its adhesion after warm storage. Thus when both products are stored at 50° C. for 7 days the polyamide seal is unaffected while the other product exhibits practically no adhesion even at room temperature. The shell sealed with the rubber blend when fired causes an undesirable deposit of resinous material on the walls of the gun chamber which interferes with the easy ejection of shells from the gun. The polyamide sealed shell does not build up a deposit in the gun barrel in this manner and is free from ejection difficulties. The polyamide composition holds the paper disc to the end of the shell so firmly that when the shell is fired all of the paper remains attached to the shell and none leaves the gun barrel with the shot.

Example II

An interpolyamide is prepared by heating 40 parts of hexamethylenediammonium adipate, 30 parts of hexamethylenediammonium sebacate and 30 parts of caprolactam for 3 hours at 200°–220° C., the pressure then being gradually reduced to 10–20 mm. and finally held at this pressure for 2½ to 3 hours at 240°–250° C. A film 0.001" thick was prepared by casting a solution of 20 parts of this polyamide in 80 parts of alcohol and 20 parts of water. The crimped end of a shot shell similar to that used in the preceding example is roughened with an emery wheel and a disc formed from the above mentioned polyamide is placed on the end of the shell. A paper disc is placed over the polyamide disc and a hot plate at 190° C. is pressed against the paper disc for 4 seconds. An excellent seal is formed which remains unaffected at elevated temperatures and after storage at elevated temperatures for long periods of time.

Other polyamide compositions which may replace those used in the foregoing examples are given below.

Example III

A polyamide is prepared by reacting 60 parts of hexamethylenediammonium adipate and 40 parts of piperazine-sebacic acid salt by heating at atmospheric pressure 3 hours at 200° C., 3 hours at 250° C., and then 3 hours under 10–20 mm. vacuum at 250°–255° C. A solution suitable for application by means of a doctor knife is formed by dissolving 10 parts of the polymer in 40 parts of an equivolume mixture of chloroform and methanol.

Example IV

A polyester-amide is prepared by heating 85 parts of an equimolecular mixture of ethylene glycol and adipic acid and 15 parts of hexamethylenediammonium adipate over a period of 16 hours to a final temperature of 200° C. The reaction product is placed in a heavy duty mixer and heated to 165° C. Five parts of hexamethylene diisocyanate are added over a period of 15–20 minutes and the mixer allowed to run and the product maintained at a temperature of 165° C. for an additional 20 minutes. The finished product is placed on a smooth roll rubber mill and milled for 30 minutes. The milled product is dissolved in four times its weight of an equivolume mixture of chloroform and methanol. The solution can be applied as in Example I.

The procedure described herein is also useful in other applications for bonding waterproofed paper (which as defined herein refers to paper coated or impregnated with wax or oil or with both) to itself or to ordinary paper, cloth, rubber, metal or other material. For example, a bond paper to which has been applied a 0.002" film of the polyamide solution described in Example III is heat sealed readily to waxed wrapping paper by pressing it against a hot plate at 200° C. When cold it is impossible to remove the paper strip from the waxed paper without tearing the paper. A similar seal made from a rubber, paraffin and ester gum blend loses its adhesion at 75° C. whereas the polyamide-sealed product is unimpaired at this temperature. After a week's storage at 50° C. the polyamide-sealed product is substantially unchanged while the rubber-blend sealed product has practically no adhesion at room temperature. A strip of 50# Litho paper similarly coated with the polyamide solution of Example IV yields a bond of high tensile strength and good aging characteristics upon sealing the polyamide coated paper to the waterproof paper used in making milk containers. The crimped top of the usual waxed paper milk containers are also efficiently sealed by interposing a polyamide film between the waxed surfaces and uniting them by heat and pressure.

In addition to the fabrication of sealed waterproof containers such as milk containers, drinking cups, and other beverage containers, the present procedure is useful in sealing waxed paper wrappings for food products which tend to take up moisture, and for soap wrappers.

The bonding agent used in this invention need not consist solely of synthetic linear polyamide. As indicated in Example I, it can contain plasticizers. Other modifying agents, e. g. resins, oils, dyes, antioxidants, and fillers, can also be present.

As many apparently widely different embodiments of this invention may be made without departing from the spirit and scope thereof, it is to be understood that I do not limit myself to the specific embodiments thereof except as defined in the appended claims.

I claim:

1. An article of manufacture comprising material having a waterproofed paper surface and a member adhesively joined to said surface with a film of diisocyanate treated synthetic linear polyester-amide carried by said surface and directly adherent thereto, said paper being waterproofed with a substance selected from the class consisting of oils and waxes.

2. The article set forth in claim 1, in which said paper is waterproofed with a combination of paraffin wax and drying oil.

JESSE HARMON.